US008540265B2

(12) United States Patent
Malone

(10) Patent No.: US 8,540,265 B2
(45) Date of Patent: Sep. 24, 2013

(54) MANUALLY PROPELLED SCOOTER

(76) Inventor: Brendan W. Malone, Toronto (CA)

( * ) Notice: Subject to any disclaimer, the term of this patent is extended or adjusted under 35 U.S.C. 154(b) by 0 days.

(21) Appl. No.: 13/506,209

(22) Filed: Apr. 4, 2012

(65) Prior Publication Data

US 2012/0267871 A1    Oct. 25, 2012

(30) Foreign Application Priority Data

Apr. 19, 2011    (CA) ..................... 2737633

(51) Int. Cl.
*B62M 1/16*    (2006.01)

(52) U.S. Cl.
USPC ...................................... 280/242.1

(58) Field of Classification Search
USPC ............... 280/242.1, 240, 234; 74/551.8
See application file for complete search history.

(56) References Cited

U.S. PATENT DOCUMENTS

| 155,183 | A | * | 9/1874 | Dale et al. ..................... 280/265 |
| 581,985 | A | * | 5/1897 | Fritz ............................. 280/234 |
| 1,572,335 | A | | 2/1926 | Valkenburg |
| 1,801,895 | A | * | 4/1931 | Ambrose ....................... 280/240 |
| 2,114,648 | A | * | 4/1938 | Bevier ........................... 280/240 |
| 2,147,517 | A | * | 2/1939 | Bokenkroger ................ 280/240 |
| 2,732,221 | A | * | 1/1956 | Welch ........................... 280/246 |
| 5,257,553 | A | * | 11/1993 | Cheng ............................ 74/551.8 |
| 5,297,810 | A | * | 3/1994 | Lukyanov ................... 280/250.1 |
| 7,914,028 | B2 | * | 3/2011 | Pastilha ........................ 280/244 |
| 2011/0018220 | A1 | * | 1/2011 | Huang .......................... 280/234 |

* cited by examiner

*Primary Examiner* — Joseph Rocca
*Assistant Examiner* — Daniel Yeagley

(57) ABSTRACT

A scooter with a foot platform, front and rear wheels at the forward and rear ends of the foot platform, and a bearing at the forward end of the platform; a steering column mounting sleeve attached to the bearing, a front wheel drive shaft slidable within the steering column mounting sleeve, a hub extension at the lower end of the steering column mounting sleeve supporting the front wheel, a drive extension having a drive member on the lower end of the front wheel drive shaft, a drive pinion coupled to the front wheel and engaged with the drive member and hand bars at the upper end of the steering column mounting sleeve operable by downward movement to slide the front wheel drive shaft downwardly through the steering column mounting sleeve for driving the front wheel.

7 Claims, 6 Drawing Sheets

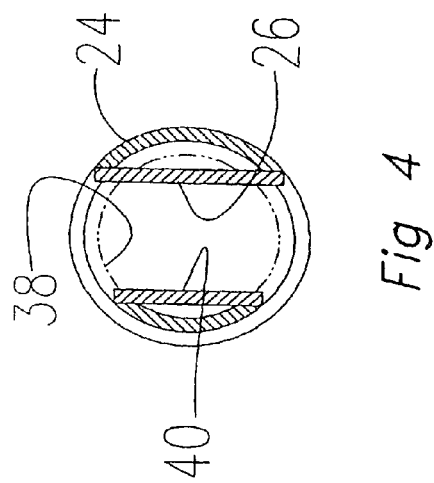
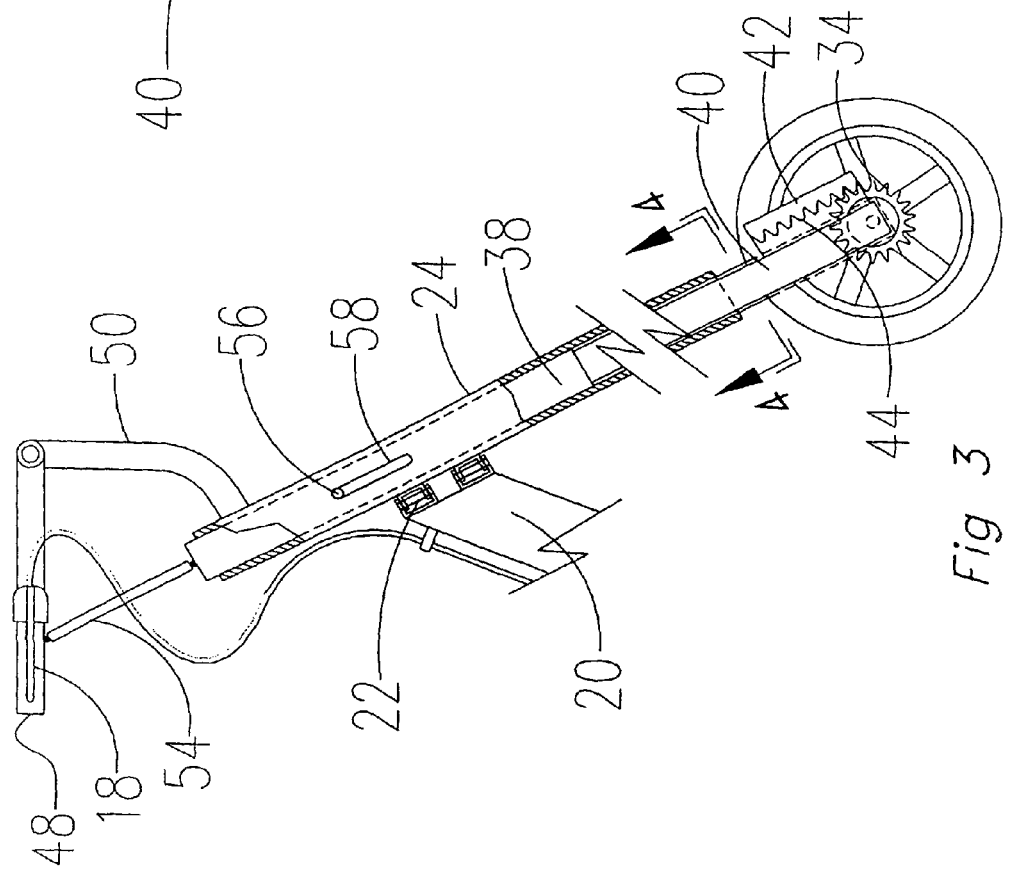

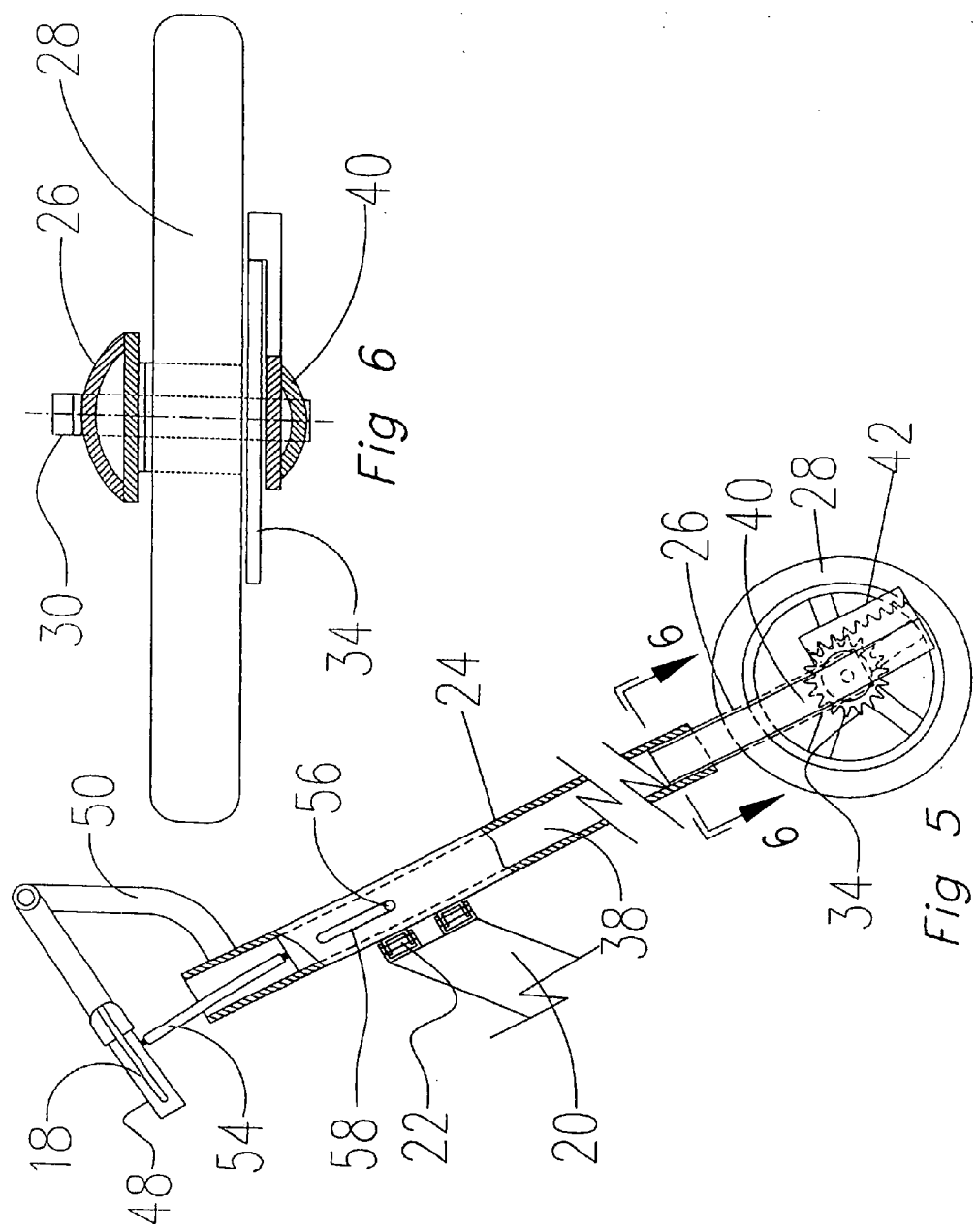

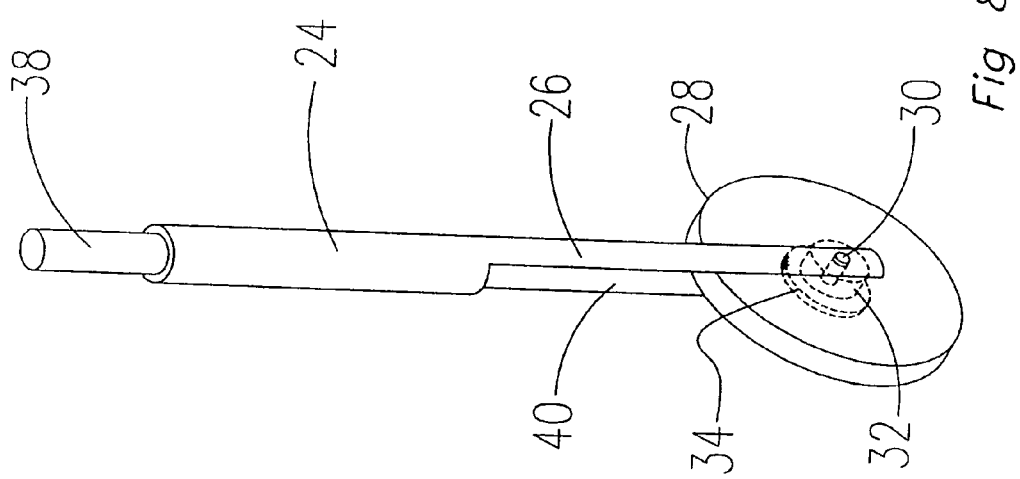
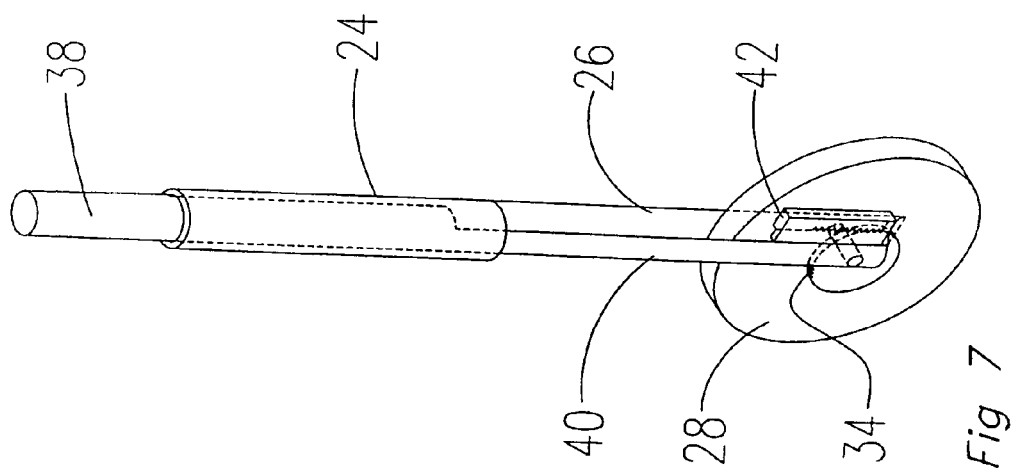

MANUALLY PROPELLED SCOOTER

FIELD OF THE INVENTION

The Invention relates to a Scooter, and in particular to a Scooter which is propelled by manual operation in which the user operates a Scooter drive mechanism by moving his arms.

BACKGROUND OF THE INVENTION

The design of Scooters usually involves a foot platform, and two wheels, and an upright steering column. The foot platform is designed to carry the weight of the rider riding on either one or both feet. The wheels are located at the forward and rearward ends of the platform. Usually, the upright steering column is connected to the front wheel, so that the scooter can be guided. In the majority of cases, propelling the scooter is achieved by standing with one foot on the platform, and pushing off along the ground with the other foot. Some scooters incorporate a manual brake connected to one of the wheels, by which the scooter can be stopped.

Some scooter designs have employed a form of foot-powered swinging platform. In these designs the platform can move upwardly and downwardly somewhat like a treadle. The platform is usually connected to the back wheel by some form of crank, so that the back wheel is driven by pressing the moveable treadle portion of the platform downwardly. However, powering a scooter by movement of the feet on such a treadle is not always desirable. It may make it difficult to keep the balance on the scooter and may make the riding unstable, or even unsafe.

Accordingly, in order to power a scooter by means other than by simply pushing with one foot along the ground, it is considered desirable to provide a manual operation by means of which the arms can be used to provide power to drive the scooter forwardly. This will make it easier to keep balance on the scooter and centre the weight, so that the scooter does not tip over.

In addition, it also provides useful exercise for the muscles of the arms, back and abdomen. Such a scooter will be primarily used as a recreational device rather than a means of actual transportation from one place to another, although of course it is possible that the scooter can be used for personal transportation if that is desired.

BRIEF SUMMARY OF THE INVENTION

With a view to providing a manually propelled scooter, the invention provides a scooter having a foot platform, front and rear wheels at the forward and rear ends of the foot platform, a steering column mounting sleeve at the forward end of the platform, a front wheel drive shaft mounted in the steering column mounting sleeve and being telescopically slidable therethrough, a hub extension at the lower end of the steering column mounting sleeve for mounting the front wheel, a drive extension on the lower end of the front wheel drive shaft, a drive member at the lower end of the drive extension, a drive pinion coupled to the front wheel and engaged with said drive member, and, hand bars at the upper end of said steering column mounting sleeve, coupled to the front wheel drive shaft and operable to slide the front wheel drive shaft downwardly and upwardly, through the steering column mounting sleeve for driving the front wheel.

The invention further provides such a scooter in which the drive pinion is coupled to the front wheel through a one-way drive wherein movement of the drive member in one direction powers the forward rotation of the front wheel, and movement of the drive member or rack in the reverse direction releases the front wheel, for free running.

The drive member for driving the pinion may be in the form of a rack gear, or may be a chain, such as a length of typical bicycle chain for example, engaging the pinion.

The invention further provides such a scooter wherein the hand bars comprise a transverse portion coupled to the steering column mounting sleeve, and rotatable relative thereto, and two hand holding portions displaced at angles to said central portion, and moveable through downward and upward arcs, and linkage connected to the front wheel drive shaft whereby to reciprocate said front wheel drive shaft through said steering column mounting sleeve.

The invention further provides such a scooter wherein said steering column mounting sleeve has a lower end and an upper end and wherein the front wheel drive shaft incorporates an upper driven end extending from said upper end of said steering column mounting sleeve, and wherein said hand bars are connected to said upper driven end of said front wheel drive shaft by linkage, whereby downward and upward angular movement of said hand bars will drive said front wheel drive shaft downwardly and upwardly.

Advantageously spring biassing means can operate to urge said front wheel drive shaft upwardly.

Preferably the steering column mounting sleeve is coupled to the platform through a rotatable bearing whereby the steering column mounting sleeve and the front wheel drive shaft can be swung from side to side for steering.

Preferably there is a slide limiting pin extending through a slot the steering column mounting sleeve and is secured in the front wheel drive shaft, whereby sliding of said front wheel drive shaft through said steering column mounting sleeve is limited by the length of said slot.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 3 is an enlarged partially cut-a-way view of the drive column and front wheel;

FIG. 4 is a section along 4-4 of FIG. 3;

FIG. 5 is cut-a-way enlarged view of the drive column and hand bars;

FIG. 6 is a section along 6-6 of FIG. 5;

FIG. 7 is a cut away perspective of the front wheel assembly, from a first side;

FIG. 8 is a cut away perspective of FIG. 7 from a second side; and,

DESCRIPTION OF A SPECIFIC EMBODIMENT

Figure 1:
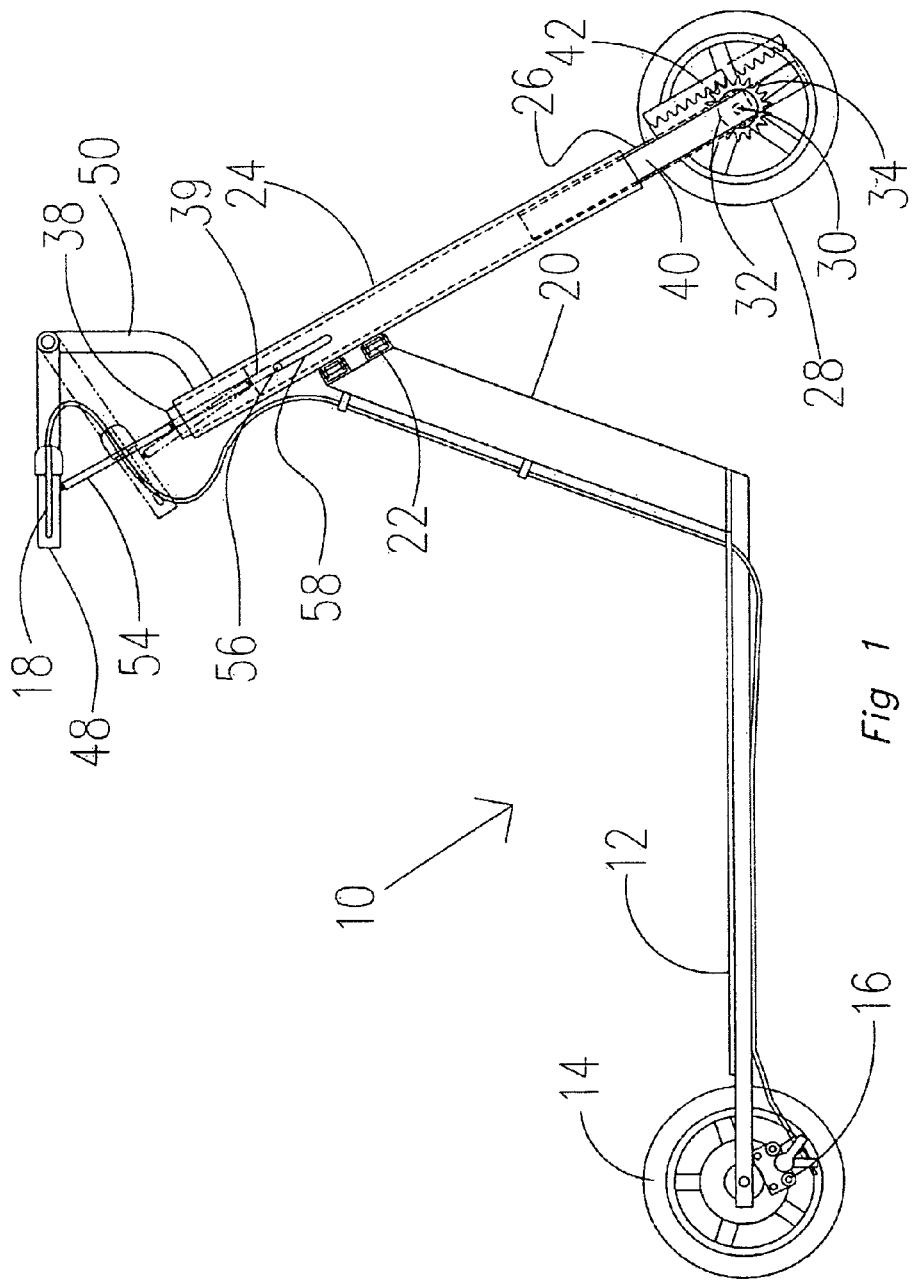
FIG. 1 is a side elevation of a scooter illustrating the features of the invention.
Figure 2:
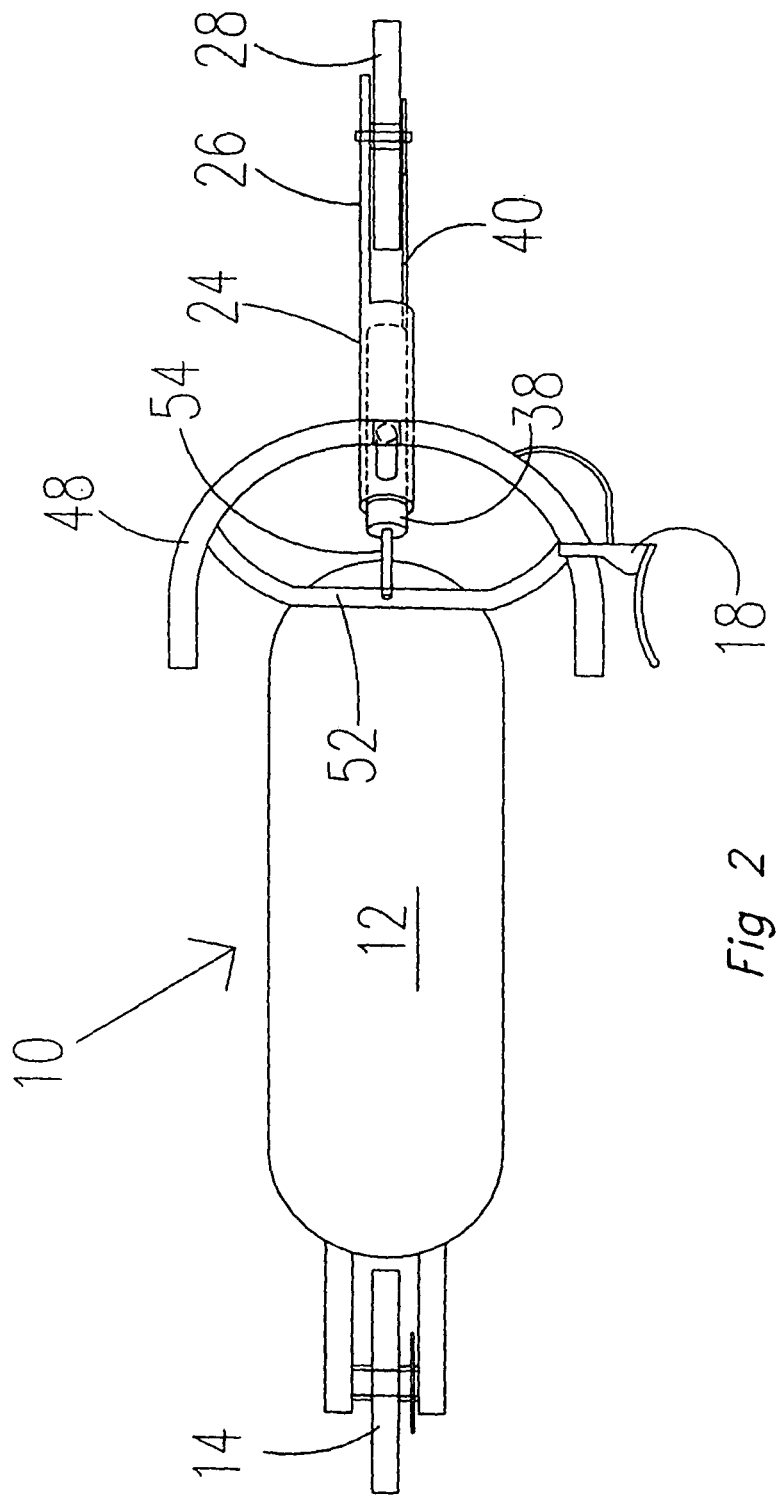
FIG. 2 is a top plan of the scooter in FIG. 1.

As already explained, the invention provides a manually propelled scooter, i.e. a scooter which can be propelled by movement of the arms and hands.

This will enable a rider to place one or both feet on the scooter, and then simply propel the scooter along by hand and arm movement.

By way of illustration, one embodiment of the invention is shown and described in relation to FIGS. 1 to 8.

The manually propelled scooter (10) Is shown having a foot platform (12), with a rear wheel (14) rotatively attached to its rear end.

A brake (16) is shown, for the rear wheel, in this case operated by a cable and brake handle (18).

At the forward end of platform (12) an upwardly angled front frame (20) is attached. At the upper end of front frame (20) there is swingable bearing (22).

A steering column mounting sleeve (24) is swingably mounted to the swingable bearing (22).

Steering column mounting sleeve (24) is of generally cylindrical shape in section for simplicity, although other shapes may suggest themselves to persons skilled in the art. Steering column mounting sleeve (24) can be swung relative to swingable bearing (22) from side to side for steering the manually propelled scooter. The steering column mounting sleeve (24) has a lower end hub extension (26). This may be generally semi-cylindrical in section, and extends down along a first side of a front wheel (28) (FIG. 8).

An axle (30) is secured in the end of hub extension (26) and rotatably supports the front wheel (28).

Front wheel (28) incorporates a one way free wheel bearing (32), of a type know per se, such as is well known in the bicycle art, and needs no description. A drive pinion (34) is secured to the one way bearing. By operation of the drive pinion (34) forwardly (in this case viewed from the right, clockwise) the front wheel will be driven forwardly.

When the drive pinion is rotated in the reverse direction (in this case viewed from the right, anti clockwise) the free wheel bearing (32) will rotate rearwardly, but the front wheel will be free to continue forward rotation, from momentum.

Within steering column mounting sleeve (24) a front wheel drive shaft (38) is supported.

Drive shaft (38) is of cylindrical shape in section, in this example, so as to complement the interior of steering column mounting sleeve (24) and is dimensioned to make a good sliding fit within steering column mounting sleeve (24). A spring such as (39) is provided to urge shaft (38) upwardly. In this way the drive shaft (38) can be slid downwardly against the spring, and will rise upwardly through the steering column mounting sleeve (24).

A drive shaft lower end (40), FIG. 3, and 4, extends downwardly from the drive shaft (38), and extends out of the steering column mounting sleeve (24). This may also be of generally semi-cylindrical shape in section, for convenience. It extends partly along the left side of the front wheel.

A drive member (42) is secured to the drive shaft lower end (40) of the drive shaft (38), and lies alongside the front wheel (28) on its second (left) side. In this embodiment the drive member is in the form of a rack gear.

The drive member (42) has rack teeth (44) in this case, and these teeth engage the drive pinion (34). It will thus be seen that downward movement of the drive shaft (38) will impart clockwise forward motion to the drive pinion (34), and thus forward motion to the front wheel (28).

Upward, reverse movement of the drive shaft (38) will simply rotate the free wheel bearing (32) in the reverse direction (anti clockwise), without impeding the continued rotation of the front wheel.

At the upper end of steering column mounting sleeve (24) hand bars (48) are mounted transversely. Hand bars (48) are rotatable mounted on any suitable angled bar (50). Hand bars (48) can be swung between downward and upward positions. Hand bars (48) are formed into generally right angle bends at their free ends for convenience of the rider. Hand bars (48) have a cross rod (52.)

One or more drive links (54) connect the cross rod (52) of hand bars (48) to the drive shaft (38).

It will be apparent that by pushing and swinging the hand bars downward, the link (54) will force the drive shaft (38) downward, and thus drive the front wheel forward. When the hand bars are raised or swung up, the drive shaft will be drawn up through the steering column mounting sleeve.

If desired any suitable spring (of a type known per se, and not shown) can be incorporated in the steering column mounting sleeve, to assist in pushing the hand bars upwardly, and to hold them in their upward position, when the scooter is not in use. Preferably a limit pin (56) extends through slots (58) in steering column (24) and is attached to drive shaft (38). In this way the movement of drive shaft (38) withing the steering column is restricted by the limits of the slot.

Figure 9:
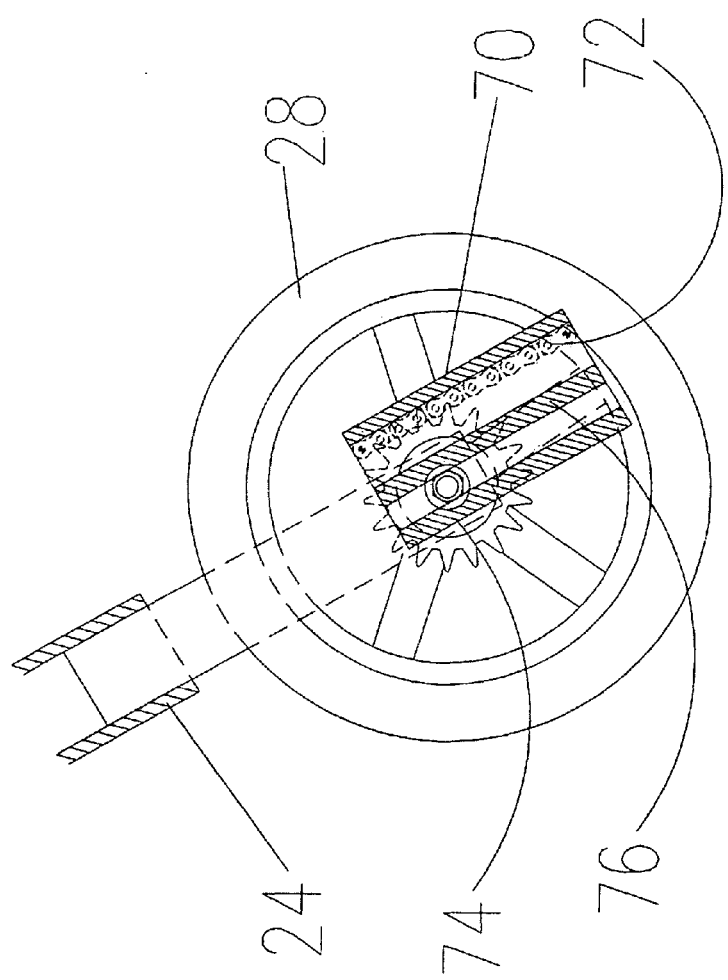
FIG. 9 is a cut away side view of an alternate form of drive member, in this case a chain drive.

An alternate embodiment is shown in FIG. 9. In this case the drive member is in the form of a chain, such as a piece of typical bicycle chain known per se. For this purpose, and drive frame (70), is provided. The chain (72) in this case is attached to the drive frame, in a straight linear arrangement. The chain is supported by the frame and cannot flex. The drive frame is attached to the lower end of the drive shaft extension.

To guide and control movement of the drive frame, guide bars (74) and (76) are provided. These ride, in this case, on opposite sides of the front wheel axle. When the drive shaft extension is pushed down, the chain will drive the pinion forward. The chain is held firmly in contact with the pinion by bars (74) and (76).

When the drive shaft extension is pulled (or spring urged) upwardly, the chain will rotate the pinion in reverse. However due to the free wheel connection between the pinion and the front wheel, the front wheel will continue to rotate freely in the forward direction.

It will be appreciated that the chain could also be a continuous loop of chain. In this case an idler gear, known per se and not shown, would be provided so that the chain could run around the idler and the drive pinion.

The drive shaft extension could be simply attached to the chain, between the drive pinion and the idler gear.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A scooter having a foot platform defining forward and rear ends, front and rear wheels at the forward and rear ends of the foot platform, and comprising;

a swingable bearing at the forward end of the platform;

a steering column mounting sleeve attached to the swingable bearing, and being rotatable relative to said bearing, said sleeve defining a lower end and an upper end;

a front wheel drive shaft extending through said steering column mounting sleeve and being slidable therethrough, said front wheel drive shaft having an upper driven end extending from said upper end of said steering column mounting sleeve and having a lower end extending from said lower end of said sleeve;

a hub extension at the lower end of the steering column mounting sleeve for mounting the front wheel;

a drive extension on the lower end of the front wheel drive shaft;

a drive member on the drive extension;

a drive pinion operatively connected to said drive member and coupled to the front wheel through a one-way drive wherein downward movement of the drive extension powers the forward rotation of the front wheel, hand bars at the upper end of said steering column mounting sleeve connected to said upper end of said front wheel drive shaft by linkage, and being operable to slide the front wheel drive shaft downwardly, through the steering column mounting sleeve and rotating said drive pinion for driving the front wheel forwardly; and, spring biasing means in said steering column mounting sleeve to urge said front wheel drive shaft and said hand bars upwardly.

2. A scooter as claimed in claim 1 wherein the hand bars comprise a transverse portion coupled to the steering column mounting sleeve, and rotatable relative thereto, and two hand holding portions displaced at angles to said transverse portion, and moveable through downward and upward arcs.

3. A scooter as claimed in claim 2 and including a slide limiting pin extending through a slot in the steering column mounting sleeve, and said pin being secured in said front wheel drive shaft whereby sliding of said front wheel drive shaft through said steering column mounting sleeve is limited by the length of said slot.

4. A scooter as claimed in claim 2 including a cross rod extending between said hand bars, and said linkage being attached to said cross rod.

5. A scooter as claimed in claim 1 wherein said drive member is a rack gear.

6. A scooter as claimed in claim 1 wherein said drive member is a chain.

7. A scooter as claimed in claim 6 including a drive frame attached to said drive shaft, and guide bars on said drive frame, and wherein said chain is attached to said drive frame and is supported thereby in contact with said pinion.

* * * * *